United States Patent [19]

Carpenter, Jr. et al.

[11] 3,983,940

[45] Oct. 5, 1976

[54] WATER-EXTERNAL MICROEMULSION AND METHOD OF RECOVERING OIL THEREWITH

[75] Inventors: Clarence W. Carpenter, Jr.; Walter W. Gale, both of Houston, Tex.

[73] Assignee: Exxon Production Research Company, Houston, Tex.

[22] Filed: June 20, 1975

[21] Appl. No.: 588,759

Related U.S. Application Data

[63] Continuation-in-part of Ser. No. 430,311, Jan. 2, 1974, abandoned.

[52] U.S. Cl. ............................ 166/273; 166/274; 252/8.55 D
[51] Int. Cl.² ............................................. E21B 43/22
[58] Field of Search ........ 166/273, 274, 275, 305 R; 252/8.55 D

[56] References Cited
UNITED STATES PATENTS

| | | | |
|---|---|---|---|
| 2,356,254 | 8/1944 | Lehmann, Jr. et al. | 166/305 R |
| 3,446,282 | 5/1969 | Cooke, Jr. | 166/274 |
| 3,474,865 | 10/1969 | Gogarty et al. | 166/274 |
| 3,497,007 | 2/1970 | Williams et al. | 166/273 |
| 3,605,891 | 9/1971 | Ayers, Jr. | 166/273 |
| 3,682,247 | 8/1972 | Jones | 166/273 |
| 3,734,185 | 5/1973 | Jones | 166/273 |
| 3,799,263 | 3/1974 | Prillieux et al. | 166/275 |
| 3,827,497 | 8/1974 | Dycus et al. | 166/275 X |

*Primary Examiner*—Stephen J. Novosad
*Assistant Examiner*—George A. Suckfield
*Attorney, Agent, or Firm*—Gary D. Lawson

[57] ABSTRACT

A water-external microemulsion and a method of recovering crude oil therewith, the water-external microemulsion being one which comprises at least 90% by weight of an aqueous medium, an oil component and a surfactant comprising a $C_{8-16}$ orthoxylene sulfonate in an amount greater than the critical micelle concentration to form the microemulsion. The water-external microemulsion allows for effective and efficient crude oil recovery by providing minimum adsorption and low oil-water interfacial tension.

27 Claims, 2 Drawing Figures

WATER-EXTERNAL MICROEMULSION AND METHOD OF RECOVERING OIL THEREWITH

CROSS-REFERENCE TO RELATED APPLICATION

This application is a Continuation-In-Part of U.S. patent application Ser. No. 430,311, filed Jan. 2, 1974, now abandoned.

BACKGROUND OF THE INVENTION

1. Field of the Invention

This invention relates to a novel microemulsion system and a method of recovering crude oil therewith. More specifically, this invention relates to a novel water-external microemulsion system comprising at least 90% by weight of an aqueous medium, an oil and as the surfactant, a $C_{8-16}$ orthoxylene sulfonate and a method of recovering crude oil therewith through a secondary or tertiary microemulsion flooding technique.

2. Description of the Prior Art

The crude oil which is accumulated in subterranean formations is recovered or produced therefrom through one or more wells drilled into the subterranean formation with the initial production of the crude oil being carried out by what is referred to as "primary recovery," i.e. where only initial formation energy is used to recover the crude oil. The primary recovery technique, however, leaves substantial quantities of crude oil in the subterranean formation. Accordingly, the recognition of the large amount of crude oil in many oil-producing subterranean formations and reservoirs has led to the use of so-called "secondary and tertiary recovery" techniques which have as their primary purpose the economical recovery of additional quantities of oil known to be present in the subterranean formation or reservoir after primary depletion.

Probably one of the most common secondary recovery techniques is the so-called "waterflooding" in which aqueous fluids are injected at one or more points in the reservoir at pressures sufficient to be forced out into the reservoir and toward a spaced production well or wells so as to effect a displacement of the oil from the pores of the reservoir and a driving of the oil ahead of the water front to the production well or wells.

As can be easily understood the waterflooding technique and similar secondary recovery techniques are only advantageous when the cost of the water and any additional necessary chemical modifiers is less than the value of the oil which is recovered after primary depletion. Accordingly, the displacement efficiency of the waterflood and similar techniques has been a determining factor in connection with whether such techniques can be satisfactorily used in oil recovery.

The displacement efficiency of the water itself is relatively poor primarily due to the discontinuous oil droplets which are formed as the waterflood proceeds. There is a relatively high interfacial tension between the water and the oil which contributes to the capillary retention of the discontinuous oil and thereby prevents its displacement by water under pressure gradients feasible in reservoir flooding processes. The displacement efficiency decreases with increasing interfacial tension thereby making recovery of oil quite difficult.

As a result of the foregoing, various aqueous surfactant systems have been proposed for use in waterflooding processes for recovering oil. Thus, it has been proposed that the interfacial tension between the oil and water can be reduced from a characteristic value of the order of 35 dynes per centimeter to a value of less than 1.0 dynes per centimeter with the proper selection of a surfactant or surfactants. Here again, however, the selection of a particular surfactant depends not only upon the ability of the surfactant to reduce the interfacial tension between the oil and water but in addition the cost of the surfactant, since again in any secondary or tertiary recovery technique the cost of the materials utilized must be significantly less than the value of the oil which can be recovered.

Not only have surfactants been utilized in secondary recovery techniques such as waterflooding, but in addition, aqueous surfactant solutions have been employed in tertiary recovery techniques utilized to recover residual oil from a "watered-out" reservoir. In such uses a slug of an aqueous surfactant system will be introduced into the watered-out reservoir followed by a driving fluid to drive the slug of aqueous surfactant through the reservoir so as to allow displacement of the residual oil trapped in the pores of the reservoir.

More recently, secondary and tertiary recovery techniques have turned toward the applicability of microemulsions, most usually oil-external microemulsions comprising an oil, i.e. a refined or crude oil, an aqueous medium, sufficient surfactant to form the microemulsion, and optionally an electrolyte and one or more co-surfactants. Such microemulsions have advantages when compared with aqueous surfactant solutions. One such advantage is that in the microemulsion there is a lessened tendency for the surfactant to be adsorbed on the formation rocks, thereby allowing a more efficient utilization of the surfactant for displacement of the crude oil in the secondary and tertiary recovery techniques.

With regard to the displacement efficiencies of microemulsions, it has been determined that the single-phase transparent or translucent microemulsions miscibly displace the crude oil when the microemulsion is in the single-phase state, but when the microemulsion breaks down into a multi-phase system, the displacement of the crude oil becomes immiscible. Accordingly, when considering microemulsions from the standpoint of a ternary diagram of oil, water and surfactant, increased efficiency can be associated with a minimization of the multi-phase region with an associated increase in the single-phase region and low interfacial tensions in the multi-phase region which are reached upon breakdown of the single-phase microemulsion upon dilution with the formation crude and water on the front edge and driving fluid on the back edge. Accordingly, these are the criteria which are used in developing efficient microemulsion systems.

Microemulsions have been proposed which contain a substantial quantity of water, and which are generally water-external microemulsions. The use of water-external microemulsions are generally advantageous from the standpoint of cost since a relatively small quantity of oil is used to form the microemulsion. The primary disadvantage, however, is that such microemulsions often do not provide decreased surfactant adsorption and minimum interfacial tensions in the multi-phase region of the oil-water-surfactant ternary diagram. Accordingly, there is a continuing need for an effective microemulsion system which can eliminate these deficiencies.

SUMMARY OF THE INVENTION

It has now been discovered in accordance with the present invention that the foregoing disadvantages associated with conventional systems can be overcome by the provision of a water-external microemulsion containing greater than 90% by weight water with sufficient oil and surfactant for minimum surfactant adsorption and highly efficient oil recovery. Such high water content, water-external microemulsion in accordance with the present invention includes as the surfactant, a $C_{8-16}$ orthoxylene sulfonate in an amount in excess of the critical micelle concentration so as to form the microemulsion with the oil comprising the remainder of the microemulsion together with optional electrolytes and co-surfactants. Generally, the surfactant is employed in a concentration of about 0.1 to about 5.0%. The low concentration of surfactant is made possible by use of the water-external microemulsion containing greater than 90% water. This microemulsion can exhibit an interfacial tension of from 0.0 to 0.1 dynes/cm with the crude oil.

The water-external microemulsion of the present invention is employed in a secondary or tertiary recovery technique wherein the water-external microemulsion is injected into a subterranean formation with subsequent injection of a driving fluid, generally thickened water followed by an aqueous drive of unthickened water. Through the use of the water-external microemulsion of the present invention, it is possible to greatly reduce the final oil saturation of the subterranean formation to a value far less than that which can be achieved through the use of the system not containing the minor amount of dissolved oil, i.e. an aqueous surfactant system.

Accordingly, it is the principal object of the present invention to provide a novel microemulsion system which eliminates the problems associated with previously proposed microemulsion systems and greatly improves conventional aqueous surfactant systems.

It is a further object of the present invention to provide such novel microemulsion system wherein the microemulsion is a high-water content, water-external microemulsion containing at least 90% by weight water, such microemulsion containing minor amounts of dissolved oil and surfactant, the surfactant being present in an amount in excess of the critical micelle concentration so as to form the microemulsion.

It is a further object of the present invention to provide a novel water-external microemulsion wherein the microemulsion exhibits an interfacial tension of from 0.0 to 0.1 dynes/cm with the crude oil.

It is still a further object of the present invention to provide such novel water-external microemulsions wherein the surfactant is employed in an amount of about 0.1 to about 5.0%, the surfactant comprising a $C_{8-16}$ orthoxylene sulfonate.

Yet a further object of the present invention comprises a method of reducing the final oil content of a subterranean formation by injecting thereinto a water-external microemulsion comprising greater than 90% by weight water with a minor amount of dissolved oil and as the surfactant, a $C_{8-16}$ orthoxylene sulfonate, in an amount in excess of the critical micelle concentration so as to form such microemulsion.

Still further objects and advantages of the novel composition and method of the present invention will become apparent from the following more detailed description thereof.

DESCRIPTION OF THE PREFERRED EMBODIMENT

Figure 1:
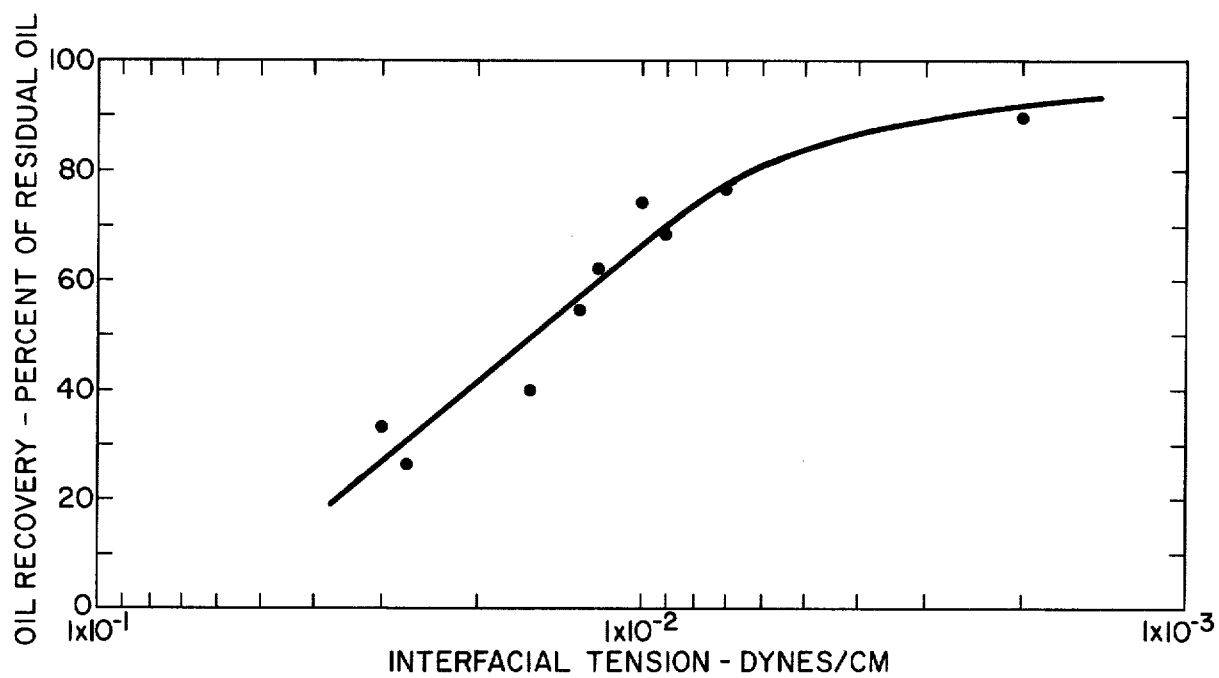
FIG. 1 is a graph of the results of core displacement tests using microemulsions which illustrates oil recovery as a function of the interfacial tension between the microemulsion injected into the cores and an oil phase which is immiscible and in equilibrium with the microemulsion. Oil recovery is expressed as a percent of residual oil recovered after a microemulsion flood. The interfacial tension is measured in dynes/cm and is plotted on a log scale.

The expression "microemulsion" as employed throughout can be defined as a stable transparent or translucent micellar solution of oil, water which may optionally contain one or more electrolytes, and one or more amphiphilic compounds, i.e. a surfactant and optionally one or more co-surfactants. The microemulsions of the present invention as previously noted are water-external microemulsions containing greater than 90% by weight water. The microemulsions of the present invention are distinguished from aqueous or surfactant solutions in that an oil is present in a minor but functional amount with the surfactant, i.e. the alkyl orthoxylene sulfonate being present in an amount in excess of the critical micelle concentration, thereby forming the microemulsion between the water, oil and surfactant. Accordingly, as used throughout, the expression microemulsion is meant to embrace any and all systems falling within the foregoing description.

In the preferred practice of this invention, one or more oils, aqueous medium, and surfactant, with optional thickener, electrolytes, and co-surfactants, are mixed in such proportions that a composition falling within the single-phase region of an oil-water-surfactant ternary diagram is formed. When a single-phase microemulsion is injected into a formation, the effects of dilution will nearly always cause the microemulsion composition to pass into the multiphase region where the microemulsion will separate into two or more immiscible phases. Therefore, as discussed previously, the criteria with respect to the applicability of microemulsions for efficient crude oil recovery lie in minimizing the multiphase region and lowering the interfacial tension between phases which are formed when the average composition of the microemulsion systems falls within the multiphase region of the ternary diagram.

The importance of minimizing the interfacial tension between immiscible phases in a microemulsion system can be best illustrated by reference to FIG. 1. This FIGURE is a graph of the results of core displacement test showing the percent of residual oil recovery as a function of interfacial tensions between the microemulsions injected into the cores and phases in equilibrium with said microemulsions.

The cores used in these displacement tests were sections of Berea Sandstone having cross sections of 1 by 1 inch and length of 12 inches. The cores had permeabilities of approximately 350 millidarcies and were mounted in epoxy with tapfittings at each end for injection and production of fluids.

Prior to conducting the displacement test, the cores were flooded with oil and brine to approximate the oil-water saturations that would exist in an oil reservoir which had been flooded to the point that no further oil could be produced. In these flooding operations, the cores were first saturated with a brine solution. The cores were then flooded with Isopar-M/Heavy Aromatic Naphtha (HAN) in a ratio of 9/1 until no further brine could be produced. Isopar-M and Heavy Aromatic Naphtha are tradenames for refined paraffinic and aromatic oils, respectively, sold by Exxon Company, U.S.A. The 9/1 ratio of the two oils was chosen to simulate crude oil. The cores were then once again flooded with brine to remove all the oil which could be recovered by this conventional waterflooding process. At this point the quantities of oil and water remaining in the cores approximated those of a reservoir which had been waterflooded to residual oil saturation. The residual oil in each of these cores was approximately 30% of the pore volume of the core; the remaining 70% was saturated with standard brine.

After the cores had been waterflooded to residual oil saturation a series of displacement tests were conducted on the cores by injecting microemulsions into the cores. The microemulsions were composed of an aqueous solution containing 1% sodium chloride, a mixture of Isopar-M/HAN, and a surfactant. The surfactant used to form the microemulsion contained 63% by weight dodecyl orthoxylene sulfonate and 37% tertiary amyl alcohol. The average composition of each microemulsion system fell within the multiphase region of a ternary diagram for that microemulsion system. The principal microemulsion phase formed from such a composition was injected into the Berea cores. This microemulsion was immiscible and in equilibrium with the Isopar-M/HAN mixture. Interfacial tension measurements were made between the microemulsion injected into each core and the oil phase which was immiscible and in equilibrium with the microemulsion. Floods were conducted at an average frontal velocity of approximately 1 foot per day.

As can be seen from FIG. 1, for effective oil recovery in a typical oil recovery process the interfacial tensions between a microemulsion and the oil phase in equilibrium with said microemulsion should be less than 0.1 dynes/cm and is preferably less than 0.01 dynes/cm.

The microemulsion of the present invention satisfies the foregoing criteria for an effective microemulsion for oil recovery by providing a stable, single-phase microemulsion with the interfacial tension between the microemulsion and the oil used to form said microemulsion which is immiscible and in equilibrium with said microemulsion being less than 0.1 dynes/cm.

The aqueous medium or water component of the water-external microemulsion of the present invention can be pure water, but is most preferably a brine having a low salt concentration. Generally, the salt is present in concentration of up to about 2% by weight, this limit being based upon the optimum salinity for the microemulsion system containing the $C_{8-16}$ orthoxylene sulfonate. Of course, the precise optimum salinity for any particular microemulsion system will depend upon particular criteria, including the particular surfactant employed and the other components of the microemulsion. As will be indicated hereinafter, the optimum salinity for the microemulsion system containing the $C_{8-16}$ orthoxylene sulfonate can be increased by inclusion of a co-surfactant into the water-external microemulsion. This allows the water-external microemulsion system to be employed in those environments in which higher salinity must be tolerated.

The water component used in the microemulsion is generally selected so as to have physical and chemical characteristics approximating the physical and chemical characteristics of the water of the formation in which the microemulsion will be employed. This matching of the physical and chemical characteristics of the formation water and the aqueous component of the microemulsion provides for increased compatibility of the miroemulsion with the contents of the formation and allows one to predict the behavior of microemulsion within the formation, including interfacial tensions, based upon laboratory tests. Accordingly, the use of the same aqueous medium or one having approximately the same chemical and physical characteristics constitutes a preferred embodiment of the present invention.

The oil employed in the water-external microemulsion of the present invention is generally employed in a minor amount, i.e. an amount of from 1% to about 9% by weight based upon the weight of the microemulsion. The oil, of course, is present in an amount sufficient to form the microemulsion and, in this manner, distinguishes the water-external microemulsion from an aqueous surfactant system. The oil employed in the water-external microemulsion of the present invention can be any refined or crude oil. Typical examples of such oils may include both sweet and sour crude oil and refined fractions such as side cuts from crude columns, crude column overheads, gas oil, kerosene, heavy naphthas, naphthas, straight run gasolines, etc. Here again, as was the case with regard to the aqueous medium, it is preferred in accordance with the present invention that the oil which is employed be one which has physical and chemical characteristics approximating the characteristics of the crude oil of the subterranean formation. The selection of any particular oil, be it a refined oil or crude oil, can be easily carried out based upon simple considerations including the chemical and physical characteristics of the crude oil of the subterranean formation and the use of any and all conventionally employed refined and crude oils is within the scope of the present invention.

The third essential component of the microemulsion of the present invention is the surfactant, i.e. $C_{8-16}$ orthoxylene sulfonate. While the alkyl group of the orthoxylene sulfonate will generally predominate in one alkyl group, generally the alkyl group has a molecular weight distribution which encompasses a portion of or the entire range set forth above with possibly minor amounts of alkyl groups of even shorter or longer chain lengths.

The preferred alkyl chain is a $C_{12}$ of dodecyl chain with a typical molecular weight distribution of an alkyl chain predominating in $C_{12}$ being as follows:

| Carbon Atoms in Side Chain | Molecular Weight Distribution |
| --- | --- |
| $C_{10}$ | 10.6 |
| $C_{11}$ | 16.1 |
| $C_{12}$ | 57.2 |
| $C_{13}$ | 9.6 |
| $C_{14}$ | 3.8 |

| Carbon Atoms in Side Chain | Molecular Weight Distribution |
|---|---|
| $C_{15}$ | 2.7 |

Accordingly, as used throughout, the term "$C_{12}$ orthoxylene sulfonate" identifies an orthoxylene sulfonate having a side chain which is 12 carbon atoms in length or in which a 12 carbon atom side chain predominates in the molecular weight distribution of the alkyl side chain.

In addition to the alkyl group of 8 to 16 carbon atoms and in addition to the sulfonate group, the orthoxylene sulfonate can optionally contain one or more groups, including additional alkyl chains which do not interfere with the basic surfactant structure and the ability of the $C_{8-16}$ orthoxylene sulfonate to perform effectively in the environment of the present invention. Accordingly, the description of the $C_{8-16}$ orthoxylene sulfonate throughout is meant to embrace the optional presence of such additional groups.

The $C_{8-16}$ orthoxylene sulfonate employed in the microemulsion of the present invention is employed in the form of a salt of the sulfonic acid. The salt forming cation can be selected from those conventionally utilized, exemplary cations being basic metals such as sodium and other alkali and alkaline earth metals, ammonium and amines. Of these, the amine salts, and particularly $C_{1-4}$ mono-, di- and trialkanolamine salts are preferred. The monoethanolamine salt of the $C_{8-16}$ orthoxylene sulfonic acid is a particularly preferred surfactant for use in the microemulsion of the present invention.

The surfactants can be prepared by techniques well known in the art, including conventional techniques of alkylation, sulfonation, and finally salt formation by reacting the sulfonic acid with a suitable base. Accordingly, the preparation of the surfactants employed in accordance with the present invention will not be exemplified further since the techniques for such production as well as the materials themselves are well known.

In preparing the microemulsion of the present invention, the surfactant must be employed in an amount in excess of the critical micelle concentration so as to form the desired microemulsion. Generally, the surfactant is employed in an amount from about 0.1 to about 5% by weight based upon the weight of the microemulsion. The remainder of the miroemulsion comprises the oil with any co-surfactant or additional electrolytes and water. Generally, the co-surfactant is employed in an amount substantially equivalent to the amount of surfactant employed in the microemulsion.

The co-surfactants which are applicably employed in accordance with the present invention include, for example, alcohols, ethoxylated alcohols, sulfated ethoxylated alcohols, sulfonated ethoxylated alcohols, ethoxylated phenols, sulfated ethoxylated phenols, sulfonated ethoxylated phenols and synthetic sulfonates.

The alcohols which are used as co-surfactants are generally $C_{3-20}$ aliphatic alcohols including, for example, isopropanol, isobutanol, the amyl alcohols such as n-amyl alcohol, 1- and 2-hexanols, 1- and 2-octanols, decanol, etc. Also included within the scope of applicable alcohols are alkylaryl alcohols such as p-nonyl phenol and alcoholic liquors such as fusel oil. Of such alcohols, particularly useful alcohols are the lower alcohols such as butanols, amyl alcohols, hexanols, etc. A particularly preferred alcohol is tertiary amyl alcohol. The ethoxylated alcohols which are applicably employed as the co-surfactant in the microemulsion and method of the present invention are generally ethylene oxide adducts of $C_6$ to $C_{20}$ primary alcohols wherein the adduct contains from 1 to about 100 moles of ethylene oxide. Such ethoxylated alcohols are available commercially from Shell Chemical Company under the trade name "Neodol" or from Conoco under the name "Alfol" and others. For example, the Neodol identified as Neodol 23-6.5 is a mixture of $C_{12}$–$C_{13}$ alcohols having on the average 6.5 ethylene oxide groups. Conoco Alfol alcohols such as Alphonic 1012-6 or 1218-6 have the following structural formulas: $CH_3 — (CH_2)_x — O — (OCH_2CH_2)_n — H$ wherein $x$ is an integer of from 8 to 16 and $n$ is an integer of 5 to 8. Alphonic 1012-6 is a $C_{10}$ $C_{12}$ primary alcohol containing six ethylene oxide units and Alphonic 1218-6 is a $C_{12}$–$C_{18}$ primary alcohol containing six ethylene oxide units. These ethylene oxide adducts of primary alcohols as well as related materials can be conveniently employed as the co-surfactant in the microemulsion and method of the present invention.

The sulfated ethoxylated alcohol co-surfactant can be prepared by suitable means such a sulfating with cholorosulfonic acid, sulfur trioxide, sulfonic acid, oleum or sulfuric acid in a suitable solvent, any of the ethoxylated alcohols described above. Preferred materials comprise ethoxylated alcoholic compounds represented by the general formula:

$$RO — (C_2H_4O)_{2-10} — H.$$

Sulfates of ethoxylated primary alcohols are commercially available from Shell Chemical Company under the trade name "Neodol 23-3A" having the formula $C_{12-13}O(CH_2CH_2O)_3SO_3NH_4$ and "Neodol 25-3S" $C_{12-15}O(CH_2CH_2O)_3SO_3Na$.

Other anionic sulfated ethoxylated alcohols are available from Union Carbide under the trade name "Tergitol S" such as Tergitol Anionic 14S-3A (ammonium salt) or 15-2-3.0 (sodium salt).

The ethoxylated phenols which can be effectively employed as the co-surfactant in accordance with the microemulsion and method of the present invention comprise ethylene oxide adducts of alkylated phenols such as octyl phenols, nonyl phenols, etc. The number of ethylene oxide groups varies from 1 to about 100 with up to 10 ethylene oxide groups being preferred. These adducts of ethylene oxide and alkyl phenols can be prepared by techniques which are well known and the adducts are commercially available materials.

For example, ethylene oxide adducts of nonyl phenols having varying numbers of ethylene oxide units are available commercially under the "Triton-N" series from the Rohm & Haas Company, Philadelphia, Pa., under the name "Igepal" available from GAF Corporation, Dyestuff and Chemical Division, and also from Antara Chemicals. Also, ethylene oxide adducts of octyl phenols are available commercially under the "Triton X" series of Rohm & Haas.

The sulfated ethoxylated phenols can be prepared by techniques well known in the art, the techniques being similar to the sulfation technique described previously with regard to the sulfated ethoxylated alcohols. Accordingly, any of the above noted ethoxylated phenols can be sulfated with the sulfated ethoxylated phenols being applicably employed as co-surfactant in the microemulsion and method of the present invention.

The sulfonated ethoxylated alcohols and phenols applicable in accordance with the present invention can be prepared by sulfonation of alcohols and phenols enumerated above followed by ethoxylation. Typical sulfonated ethoxylated phenols can be represented by the formula:

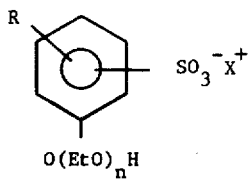

wherein R is a $C_{6-18}$ alkyl group and $n$ is an integer of 1–100. These materials can be prepared by alkylation of phenol, sulfonation of the alkylated phenol and subsequent ethoxylation.

The synthetic sulfonates which are applicable as the co-surfactant in accordance with the present invention are synthetic anionic surfactants differing in structure from the $C_{8-16}$ orthoxylene sulfonate employed as the surfactant in accordance with the present invention. The synthetic sulfonate can include a group of materials having a structural formula:

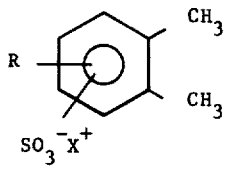

where X is a suitable cation and R is a $C_{1-7}$ alkyl group.

It should be readily apparent from the above that the discussed co-surfactants are merely exemplary of the variety of co-surfactants which can be employed to increase the brine tolerance and adjust the viscosity of the microemulsion. Accordingly, any of the conventionally employed co-surfactants capable of increasing the brine tolerance and adjusting the viscosity of the microemulsion can be effectively utilized in the microemulsion of the present invention and the present invention is not to be deemed as limited to those exemplified above.

The water-external, single-phase microemulsion of the present invention is employed in a microemulsion flooding process, generally a secondary flooding process or tertiary flooding process. When used in the foregoing manner, the microemulsion solution is injected into the subterranean formation in an amount effective to displace the crude oil in the formation toward one or more production wells. Generally, based upon economic considerations, 0.03 to 0.6 pore volume of the microemulsion solution is introduced into the formation. In a preferred embodiment of the present invention the microemulsion is injected through one or more injection means, i.e. injection wells in fluid communication with one or more production means, i.e. production wells. The microemulsion solution displaces crude oil from the interstices of the formation toward the production wells. Of course, it is possible to utilize the water-external single-phase microemulsion of the present invention in the so-called "push-pull" technique, wherein a single well acts both for injection and as a production means. This embodiment is therefore included within the description of the present invention.

For purposes of providing a favorable mobility for the microemulsion through the formation, a water thickener can be included within the microemulsion such that the viscosity of the microemulsion is equal to or greater than the viscosity of the formation crude thereby eliminating any "fingering" effect which might result from the employment of a less viscous material. Any of the conventional water-thickening agents which have been previously employed to provide this function can be advantageously utilized in the water-external microemulsion of the present invention. For example, the water-external microemulsion can be thickened with such known viscosity increasing additives as fatty acid soaps, alginates, sucrose, dextran, amines, glycerine, and a number of water soluble polymers including polysaccharides such as "Kelzan XC" sold by Kelco Co. and high molecular weight polyacrylamides, more specifically, partially hydrolyzed polyacrylamides such as "Pusher" sold by Dow Chemical Co. The water-soluble polymers such as the polysaccharides and partially hydrolyzed polyacrylamides are preferred water thickeners for use in the present invention.

The water-external microemulsion fluid is driven through the subterranean formation by means of a driving fluid which in most instances is a thickened water or thickened brine. The known viscosity increasing additives described above are applicable in the production of the thickened water or thickened brine utilized as the driving fluid for the microemulsion process, with the water-soluble polymers again being preferred. Here again the viscosity of the driving fluid is generally so controlled that the mobility of the driving fluid is equal to or less than the mobility of the water-external microemulsion so as to eliminate any fingering effect which might occur. The thickened water is generally injected in amounts which vary widely, with amounts up to two pore volumes or more being applicable. Where desired, the thickened water-driving fluid can be followed through the formation by unthickened water, generally employed in similar amounts.

While the microemulsion flooding process of the present invention is most usually carried out as a tertiary recovery technique, after primary depletion and waterflooding, the preferred method of the present invention is applicable to a secondary recovery technique wherein the same replaces the conventional waterflooding. In such case, the water-external single-phase microemulsion will be injected into the formation after primary depletion with the injection of a driving fluid to drive the microemulsion through the subterranean formation wherein the same displaces the crude oil toward one or more production wells. Whether the method of the present invention is applied as a secondary or tertiary recovery technique, the method has the same effect of providing for a more efficient and effective recovery of the crude oil within the subterranean formation through the characteristics of reduced surfactant adsorption and low interfacial tension between the water-external microemulsion and formation crude oil after the microemulsion system breaks down into the multi-phase region. It is these characteristics which allow the method of the present invention to be effectively carried out with exceptional results.

It should be appreciated from the foregoing discussion that the microemulsions of this invention are not limited to microemulsion compositions falling appreciably above the binodal curve of the ternary diagram for said microemulsion systems. A microemulsion may be used where the microemulsion is immiscible and in equilibrium with the oil used to form the microemulsion. In this case the microemulsion composition is essentially on the binodal curve. It should be understood that microemulsion phases do not exist in the multiple phase region of a ternary diagram. If the average composition of a microemulsion system falls within this multiple phase region, at least two immiscible phases will be formed and at least one of these phases will be a microemulsion having a composition falling essentially on the binodal curve.

The microemulsion and method of the present invention will now be described by reference to the following examples, it being understood that these examples are presented for purposes of illustration only and the present invention is in no way to be deemed as limited thereby:

EXAMPLE I

This example was conducted to illustrate the effectiveness of the water-external microemulsion of the present invention in the reduction of the final oil saturation of a reservoir when compared with a similar composition not containing dissolved oil, i.e. an aqueous surfactant solution. The aqueous surfactant solution which was utilized was a 1% solution of a $C_{12}$ orthoxylene sulfonate (monoethanolamine salt) in 2% NaCl water. The water-external microemulsion employed in accordance with the present invention contained the same concentration of surfactant in the same brine together with 4.8% oil, a 90/10 mixture of Isopar-M/Heavy Aromatic Naphtha (HAN), trade names for refined paraffinic and aromatic oils, respectively, sold by Exxon Company, U.S.A.

Floods were conducted in 1-foot Berea cores containing residual Loudon oil (a crude oil from the Loudon Field, Ill.) at a frontal velocity of one foot per day. A one PV bank of the surfactant was injected both in the form of the aqueous surfactant solution and in the form of the water-external microemulsion. The final oil saturation was determined for both systems, it being found that in the case of the aqueous surfactant solution a final oil saturation of 25.8% was achieved while in the case of the water-external microemulsion a final oil saturation of 5.0% was achieved. This illustrates the surprising improvement associated with the presence of a small amount of dissolved oil in the microemulsion when compared with an aqueous surfactant solution.

EXAMPLE II

This example was carried out to illustrate the effectiveness of a small proportion of dissolved oil in reducing the adsorption of the surfactant on formation rocks. The surfactant utilized in the experiments was a $C_{12}$ orthoxylene sulfonate (monoethanolamine salt) with the oil being a 90/10 Isopar-M/HAN mixture.

Static adsorption tests were made by incorporating small measured volumes (approximately 10 ml.) of 1% solutions of the surfactant tagged with Sulfur-35 with and without the oil additive with 10 grams of crushed Berea sandstone. The difference in surfactant concentration prior to contact with the rock and after equilibration was used to determine the amount of surfactant lost to the rock surface. The results of this adsorption test can be seen in Table I:

TABLE I

| System | Adsorption |
|---|---|
| 1% $C_{12}$ o-xylene sulfonate plus | mg surfactant/g. rock |
| 1% NaCl | 1.16 |
| 1% NaCl + 0.5% oil | 0.66 |
| 1% NaCl + 2.5% oil | 0.26 |

It can be seen from the data in the above table that the addition of the oil to the aqueous surfactant system greatly reduces the adsorption of the $C_{12}$ orthoxylene sulfonate and this decrease in adsorption is seen with increasing oil content. This, therefore, illustrates an advantage of the water-external microemulsion of the present invention when compared with an aqueous surfactant solution not containing dissolved oil.

EXAMPLE III

Figure 2:
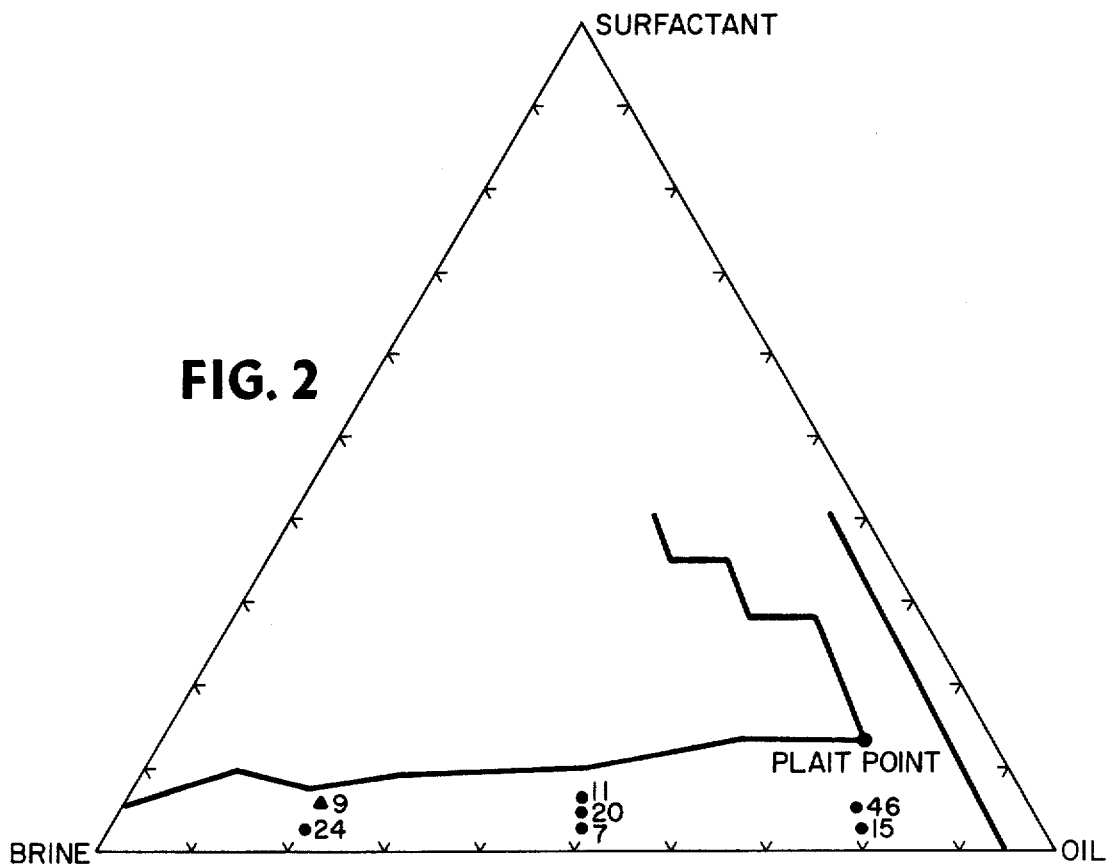
FIG. 2 is a ternary phase diagram of a microemulsion system illustrating the interfacial tensions between equilibrium phases which are formed when the microemulsion system has an average composition falling within the multiple phase region of the ternary diagram.

This example was conducted to illustrate the effectiveness of the water-external microemulsion of the present invention in the reduction of interfacial tensions between phases which are formed from oil-water-surfactant compositions falling within the multiphase region of the oil-water-surfactant ternary diagram. The microemulsion system was composed of an aqueous solution containing 1% sodium chloride, a mixture of 90/10 Isopar-M/HAN, and dodecyl orthoxylene sulfonate as the surfactant. All the interfacial tension measurements were made between immiscible phases which were formed when the average composition of the microemulsion system fell with the multiphase region of the ternary diagram. FIG. 2 illustrates a ternary diagram for this microemulsion system. The average compositions of the microemulsion system are represented in the ternary diagram (FIG. 2) by triangular points (▲) and circular points (●). If there are more than two immiscible phases formed the average composition is designated by a circular point and if there are only two immiscible phases formed the composition is designated by a triangular point. The interfacial tension between the principal microemulsion phase formed from these compositions and the oil (Isopar-M/HAN) which is immiscible and in equilibrium with the microemulsion are given in FIG. 2 in millidynes/cm. As can be seen from FIG. 2, for the microemulsion of this invention the interfacial tensions exhibited between the microemulsion and the oil range from 0.007 to 0.046 dynes/cm.

While the present invention has been described primarily with regard to the foregoing specific exemplification, it should be understood that the present invention is in no way to be deemed as limited thereto but rather must be construed as broadly as all or any equivalents thereof.

What we claim is:

1. In a method of recovering crude oil from a subterranean formation having at least one injection means in fluid communication with at east one production means wherein a displacing fluid is injected into said formation through said injection means and is driven toward said productive means by injection of a driving fluid, the improvement wherein said displacing fluid comprises a water-external microemulsion comprising:

13 a. an aqueous medium in an amount of greater than 90% based on the weight of the microemulsion;
b. an oil; and
c. a surfactant comprising a $C_{8-16}$ orthoxylene sulfonate, in an amount greater than the critical micelle concentration to form said microemulsion, said microemulsion exhibiting an interfacial tension of from 0.0 to 0.1 dynes/cm with the crude oil.

2. The method of claim 1 wherein said microemulsion is miscible with said crude oil.

3. The method of claim 1 wherein said microemulsion exhibits an interfacial tension of from 0.0 to 0.04 dynes/cm with the crude oil.

4. The method of claim 1 wherein said oil is a refined or crude oil.

5. The method of claim 4 wherein said refined or crude oil has physical and chemical characteristics substantially the same as the physical and chemical characteristics of the formation crude oil.

6. The method of claim 1 wherein said aqueous medium is a brine having a salt concentration of up to 2% by weight.

7. The method of claim 6 wherein said brine has physical and chemical characteristics substantially the same as the physical and chemical characteristics of the formation water.

8. The method of claim 1 wherein said surfactant is a $C_{12}$ orthoxylene sulfonate.

9. The method of claim 8 wherein said surfactant is a monoethanolamine salt of a $C_{12}$ orthoxylene sulfonic acid.

10. The method of claim 1 wherein said microemulsion further includes a co-surfactant.

11. The method of claim 10 wherein said co-surfactant is a $C_{1-7}$ orthoxylene sulfonate.

12. The method of claim 1 wherein said aqueous medium is a brine having a salt concentration of up to 2% by weight.

13. The method of claim 1 wherein the injection of said microemulsion if conduccted subsequent to primary depletion and waterflooding.

14. The method of claim 1 wherein said microemulsion is injected as a 0.03 to 0.6 PV slug.

15. A method of recovering residual crude oil from a primary depleted and watered-out subterranean reservoir having at least one injection means in fluid communication with at least one production means which comprises:

a. injecting into said watered-out reservoir through said injection means a water-external microemulsion comprising:
  i. an aqueous medium in an amount of greater than 90% based on the weight of the microemulsion;
  ii. an oil; and
  iii. a surfactant comprising a $C_{8-16}$ orthoxylene sulfonate in an amount greater than the critical micelle concentration to form said microemulsion, said microemulsion displacing crude oil in said formation toward said production means, said microemulsion exhibiting an interfacial tension of from 0.0 to 0.1 dynes/cm with the crude oil.
b. injecting into said formation through said injection means, a driving fluid to drive said microemulsion and crude oil through said formation toward said production means; and
c. recovering residual crude oil through said production means.

16. The method of claim 15 wherein said microemulsion is miscible with said crude oil.

14

17. The method of claim 15 wherein said oil is a refined or crude oil.

18. The method of claim 17 wherein said refined or crude oil has physical and chemical characteristics substantially the same as the physical and chemical characteristics of the formation crude oil.

19. The method of claim 15 wherein said aqueous medium is a brine having a salt concentration of up to 2% by weight.

20. The method of claim 19 wherein said brine has physical and chemical characteristics substantially the same as the physical and chemical characteristics of the formation water.

21. The method of claim 15 wherein said surfactant is a $C_{12}$ orthoxylene sulfonate.

22. The method of claim 21 wherein said surfactant is a monoethanolamine salt of a $C_{12}$ orthoxylene sulfonic acid.

23. The method of claim 15 wherein said microemulsion is injected as a 0.03 to 0.6 PV slug.

24. The method of claim 15 wherein said microemulsion further includes a co-surfactant.

25. The method of claim 23 wherein said co-surfactant is a $C_{1-7}$ orthoxylene sulfonate.

26. In a method of recovering crude oil from a subterranean formation having at least one injection means in fluid communication with at least one production means wherein a displacing fluid is injected into said formation through said injection means and is driven toward said productive means by injection of a driving fluid, the improvement wherein said displacing fluid comprises a water-external microemulsion comprising:

a. an aqueous medium in an amount of greater than 90% based on the weight of the microemulsion;
b. an oil;
c. a surfactant comprising a $C_{8-16}$ orthoxylene sulfonate, in an amount greater than the critical micelle concentration to form said microemulsion, said microemulsion exhibiting an interfacial tension of from 0.0 to 0.1 dyne/cm with the crude oil; and
d. a co-surfactant comprising a sulfonated ethoxylated phenol.

27. A method of recovering residual crude oil from a primary depleted and watered-out subterranean reservoir having at least one injection means in fluid communication with at least one production means which comprises:

a. injecting into said watered-out reservoir through said injection means a water-external microemulsion comprising:
  i. an aqueous medium in an amount of greater than 90% based on the weight of the microemulsion;
  ii. an oil;
  iii. a surfactant comprising a $C_{8-16}$ orthoxylene sulfonate in an amount greater than the critical micelle concentration to form said microemulsion; and
  iv. a co-surfactant comprising a sulfonated ethoxylated phenol, said microemulsion displacing crude oil in said formation toward said production means, said microemulsion exhibitinng an interfacial tension of from 0.0 to 0.1 dyne/cm with the crude oil;
b. injecting into said formation through said injection means, a driving fluid to drive said microemulsion and crude oil through said formation toward said production means; and
c. recovering residual crude oil through said production means.

* * * * *